United States Patent [19]

Sakamura et al.

[11] Patent Number: 4,945,472
[45] Date of Patent: Jul. 31, 1990

[54] DATA PROCESSOR WITH I/O AREA DETECTION

[75] Inventors: Ken Sakamura, Tokyo; Souichi Kobayashi, Itami, both of Japan

[73] Assignee: Mitsubihsi Denki Kabushiki Kaisha, Tokyo, Japan

[21] Appl. No.: 173,217

[22] Filed: Mar. 25, 1988

[30] Foreign Application Priority Data

Sep. 30, 1987 [JP] Japan ................................ 62-246625

[51] Int. Cl.$^5$ .............................................. G06F 3/00
[52] U.S. Cl. .................................. 364/200; 364/246.3; 364/247; 364/247.2; 364/259; 364/259.1; 364/259.7
[58] Field of Search ................................ 364/200, 900

[56] References Cited

U.S. PATENT DOCUMENTS

| | | | |
|---|---|---|---|
| 3,892,957 | 7/1975 | Bryant | 364/200 |
| 4,521,846 | 6/1985 | Scalzi et al. | 364/200 |
| 4,561,052 | 12/1985 | Tateno | 364/200 |
| 4,742,451 | 5/1988 | Bruckert et al. | 364/200 |

OTHER PUBLICATIONS

Microcomputer Architecture & Programming, John F. Wakerly, John Wiley & Sons, Inc., 1981, pp. 301–323.

Primary Examiner—Raulfe B. Zache
Attorney, Agent, or Firm—Townsend and Townsend

[57] ABSTRACT

A device for detecting whether addresses used for accessing in a memory mapped I/O system are present in the I/O area or not is provided. The device includes a mask register for logically ANDing with an incoming address. The output of the ANDing process is exclusive-ORed with an I/O address register. When an operand fetch is made to an I/O area the fetch is suspended during execution of preceding instructions. When the instruction fetch unit seeks an I/O area address, or the address calculation unit seeks an I/O area address, or data is fetched across a boundary of the I/O area, an exception is activated.

19 Claims, 4 Drawing Sheets

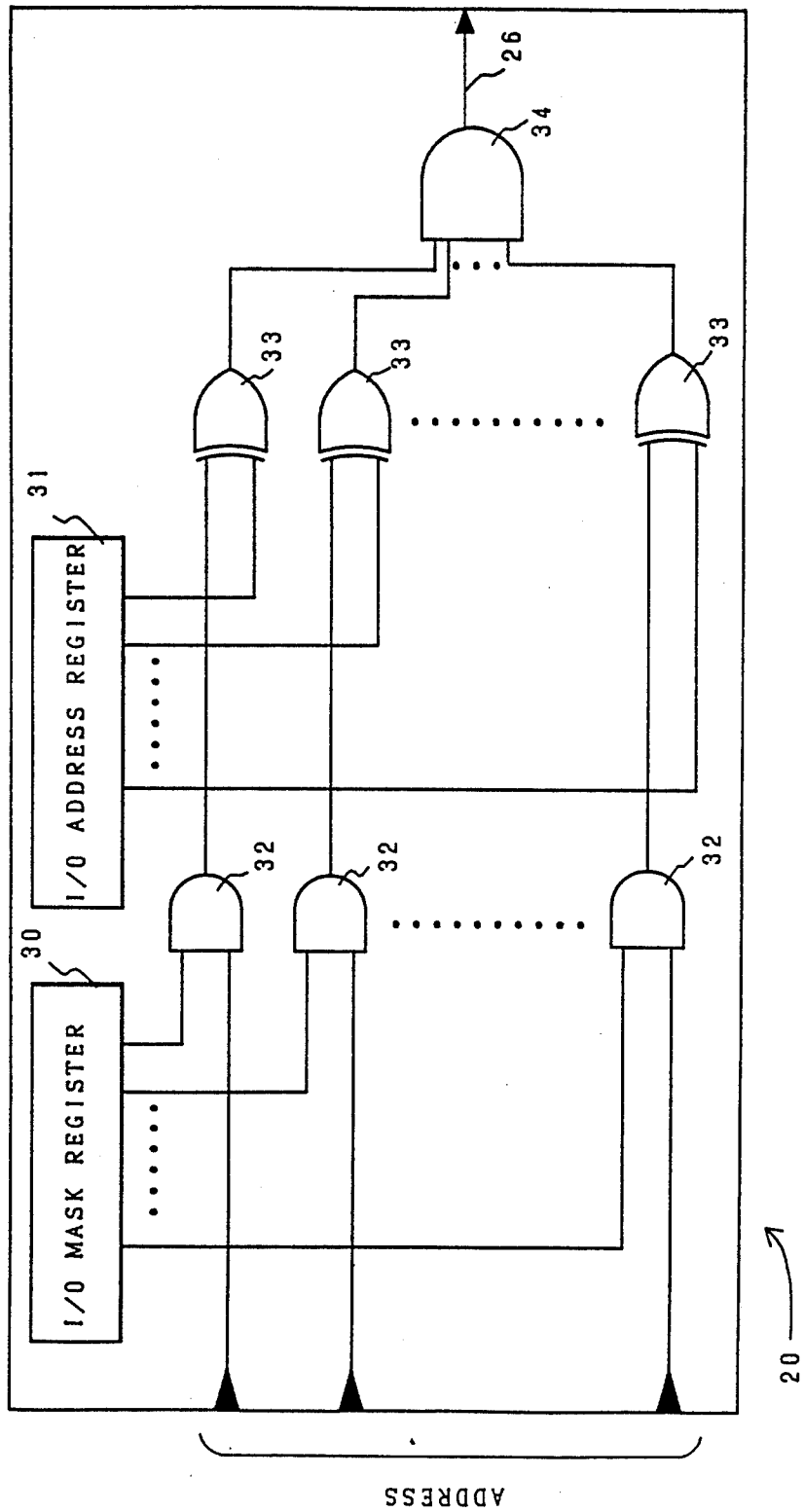

DATA PROCESSOR WITH I/O AREA DETECTION

BACKGROUND OF THE INVENTION

1. Field of the Invention

This invention relates to a data processor incorporating a system which can be constituted into a memory mapped I/O system.

2. Description of the Prior Art

Any conventional I/O bus and memory bus are very similar to each other, and the I/O instruction and load store instruction are also very similar to each other. In the light of analogy between these, such a memory-mapped I/O system is widely made available, which accesses I/O data just like the way it accesses memory, by allotting addresses in the address space of primary memory to the I/O port.

FIG. 1 is the simplified block diagram of a data processing system incorporating the memory-mapped I/O system mentioned above, which is shown in Chapter 10, "MICROCOMPUTER ARCHITECTURE AND PROGRAMMING" written by John F. Wakerly, a publication of John Wiley & Sons, Inc., 1981.

The data processing system shown in FIG. 1 is provided with data processor 1, memory 2, and I/O interface 3, which are respectively mounted on a system board and connected to each other via address bus BA, data bus BD, and the control bus BC. A plurality of I/O interfaces 3 are respectively connected to a variety of external I/O systems 4.

FIG. 2 is the schematic block diagram of a conventional pipeline-controlled data processor 1 in a system where aforesaid I/O areas is memory-mapped I/O system. The pipe-line-controlled data processor 1 is comprised of an instruction fetch unit 21 which fetches instructions from a memory 2, an address calculation unit 22 which arithmetically calculates addresses of the fetched instructions, an operand fetch unit 23 which fetches operand from the memory 2 in accordance with the calculated address, an execution unit 24 which executes processing of operand, and a bus control unit 25 which controls operations of the address bus BA and data bus BD, respectively.

However, when applying such a conventional data processor as shown in FIG. 2 to a system which converts the I/O areas as shown in FIG. 1 into the memory-mapped I/O system, there are still a variety of problems to solve, which are described below.

(1) For example, when the programmer writes a program including operations for accessing I/O areas of the operand fetch unit 23 in the pipeline shown in FIG. 2, he needs to write the program in order that the operations of the operand fetch unit 23 for accessing I/O areas can intentionally be withheld until the execution unit 24 completes the execution of the instruction. If the accessing is not intentionally withheld, there may be an occurrence of an improper state. Concretely, if the accessing is not withheld until the execution unit 24 completes the execution of the instruction, the operand fetch unit 23 prefetches data from I/O areas to cause the execution unit 24 to execute branch instruction immediately after the data is prefetched from the I/O areas. This causes the data thus far prefetched by the operand fetch unit 23 to be voided, and as a result, those data fetched from I/O areas disappear themselves. This is because, immediately after outputting data, the I/O interface 3 enters into operation for outputting the following data. In other words, the I/O interface 3 no longer retains the output data.

(2) Neither the instruction prefetched by the instruction fetch unit 21 nor the data prefetched by the address calculation unit 22 for indirectly referring to memory can be fetched from I/O areas. However, even when either the instruction fetch unit 21 or the address calculation unit 22 erroneously accesses the I/O areas, any conventional data processor could not identify a state of exception.

(3) When accessing data crosses a word boundary which defines the I/O areas and a area other than the I/O areas for example, the initial accessing is done against the area other than the I/O area, whereas the second accessing is done against the I/O areas. Although this accessing operation is actually meaningless, any conventional data processor could not identify that this accessing operation is an exception.

SUMMARY OF THE INVENTION

A conventional data processor deals with those problems mentioned above by means of software or the configuration of the systems. The present invention securely overcomes those problems mentioned above by providing a novel data processor which securely reduces burden on programs by dealing with those problems using hardware and allows the data processor to improve functional efficiency.

The data processor related to the invention incorporates means for detecting whether addresses for accessing are present in the I/O areas, or not. By virtue of this function, possibility of generating any improper state becaused by accessing against I/O areas can thoroughly be eliminated.

The above and further objects and features of the invention will more fully be apparent from the following detailed description with accompanying drawings.

BRIEF DESCRIPTION OF THE DRAWINGS

FIG. 4 is the circuit diagram of the I/O area detection unit of the data processor related to the invention.

DESCRIPTION OF THE PREFERRED EMBODIMENTS

Referring now more particularly to the accompanying drawings, a preferred embodiment of the data processor related to the invention is described below.

Figure 1:
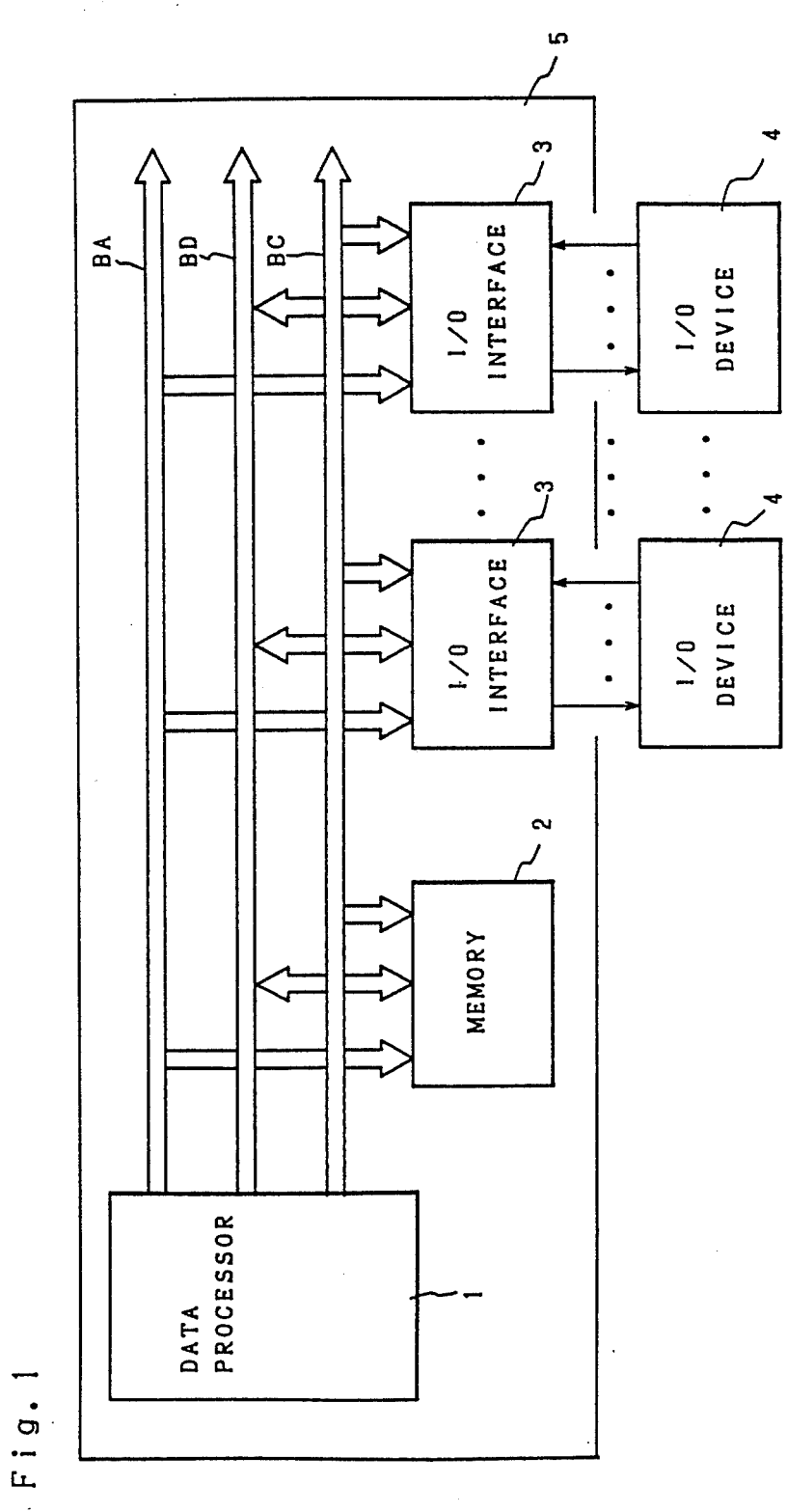
FIG. 1 is the simplified block diagram of the data processing system incorporating memory-mapped I/O system.
Figure 2:
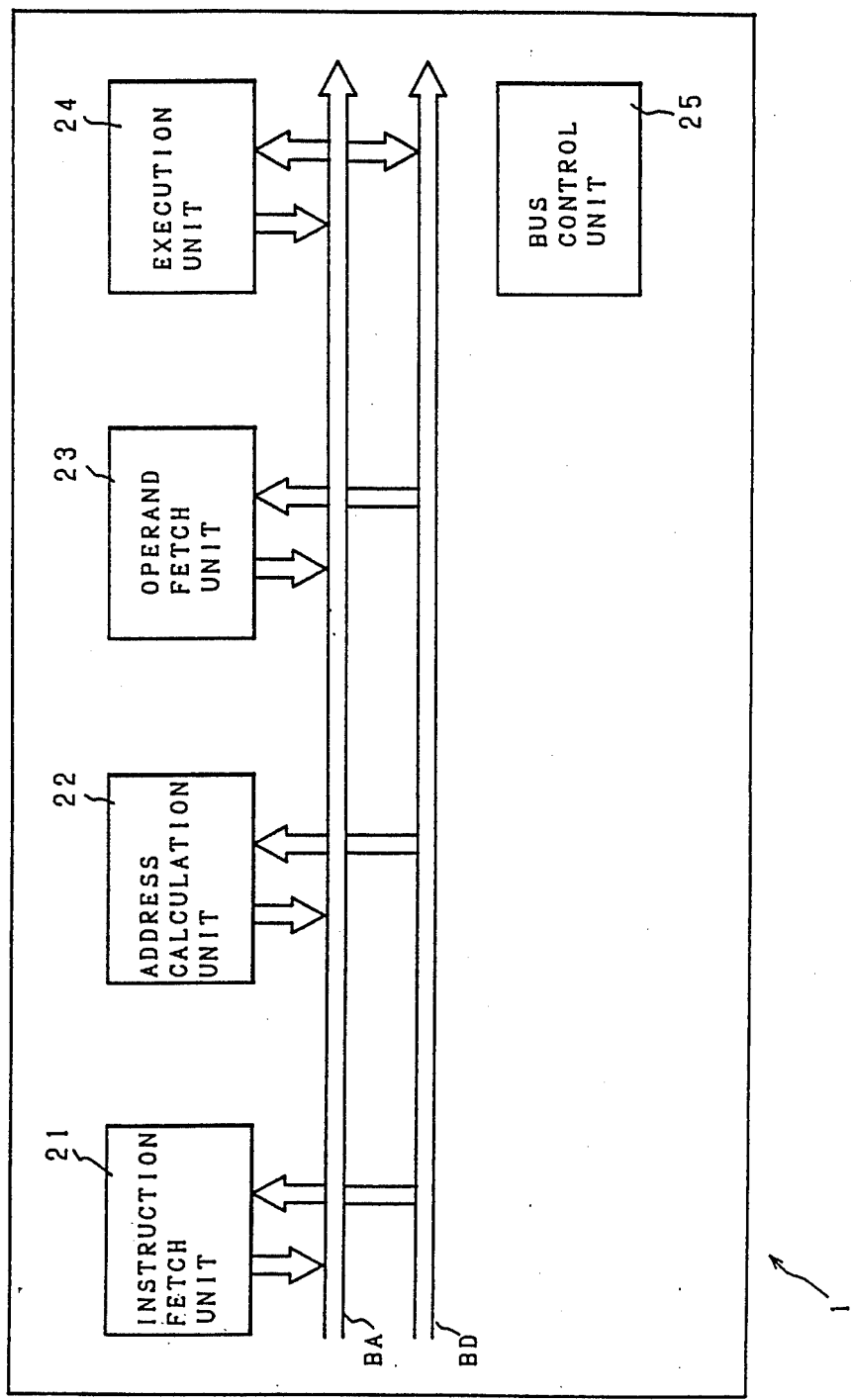
FIG. 2 is the simplified block diagram of a conventional data processor incorporating pipeline-controlled system.

FIG. 1 is the simplified block diagram of the data processing system constituted into the memory-mapped I/O system incorporating the data processor related to the invention. The data processing system incorporates a data processor 1, a memory 2, and a plurality of interfaces 3, which are mounted on a system board and connected to each other via an address bus BA, a data bus BD, and a control bus BC. A variety of external I/O systems 4 are connected to a plurality of I/O interfaces 3.

Figure 3:
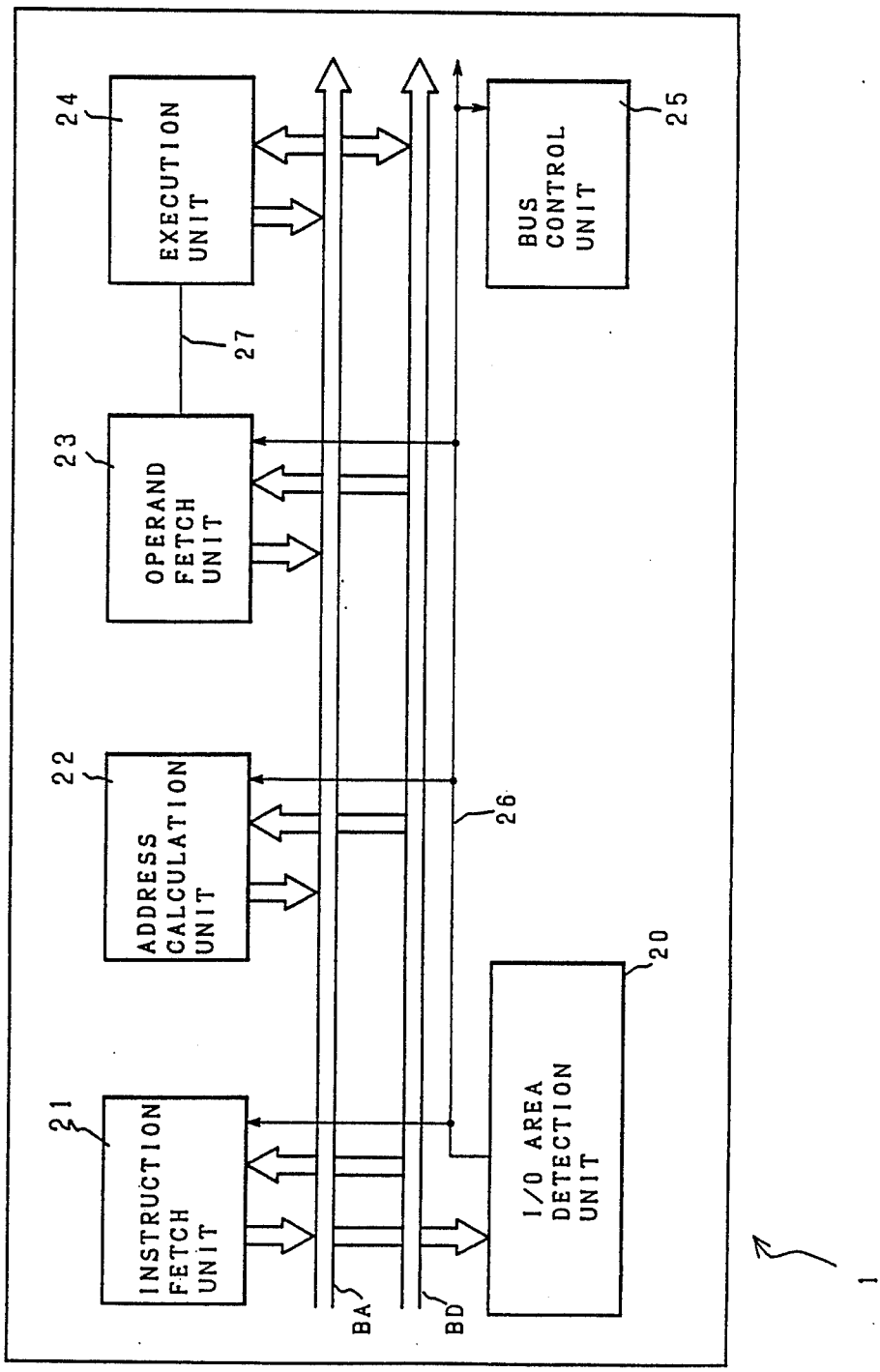
FIG. 3 is the simplified block diagram of the data processor incorporating the pipeline-controlled system related to the invention.

Although the above system is identical to any of conventional data processing systems, the data processor 1 related to the invention has the constitution which is shown in FIG. 3. The data processor 1 shown FIG. 3 is provided with an I/O area detection unit 20, an instruction fetch unit 21, an address calculation unit 22, an operand fetch unit 23, an instruction execution unit 24, a bus control unit 25, I/O area address matching signal 26, instruction execution completed signal 27, an address bus BA, and a data bus BD.

Operation of the I/O area detection unit 20 is described later on by referring to FIG. 4.

The instruction fetch unit 21 is provided with an exception activating circuit so that exception can be activated when the instruction fetch unit 21 itself accesses I/O areas.

Likewise, the address calculation unit 22 is also provided with the exception activating circuit so that an exception can be activated when the address calculation unit 22 itself accesses the I/O area.

The operand fetch unit 23 is provided with a circuit which stops execution of the operation in the fetch unit 23 itself when it accesses the I/O areas and the instruction is being executed by the instruction execution unit 24.

The bus control unit 25 is provided with a circuit which generates and outputs address strobe signals and another circuit which detects that there are accesses including one against the I/O areas and one against an area other than the I/O areas.

The instruction execution completed signal 27 is outputted from the unit which is present in the execution unit 24 and detects the completion of the execution of instructions done by the execution unit 24.

In addition, main control signals are optimized in FIG. 3.

FIG. 4 denotes the circuit diagram of the I/O area detection unit 20 shown in FIG. 3. The I/O area detection unit 20 incorporates an I/O mask register 30, and I/O address register 31, AND gates 32 and 34, and exclusive OR gate 33, respectively. Signal outputted from the I/O mask register 30 and address signals from the address bus BA are delivered to each AND gate 32, whereas signals from the I/O address register 31 and signal from each AND gate are delivered to each exclusive OR gate 33, respectively.

Referring now to FIG. 4, operations of the data processor related to the above preferred embodiment are described below.

The instruction fetch unit 21, the address calculation unit 22, the operand fetch unit 23, and the instruction execution unit 24 which make up pipeline in the data processor 1 access the memory 2 or the I/O device 4 outside of the data processor 1. Each of these units delivers the access request to the bus control unit 25 inside of the data processor 1, and then, any of these units, whose request is accepted by the bus control unit 25 enters into access enable condition.

Whenever the bus control unit 25 accepts the request from any of those units for accessing, the I/O area detection unit 20 detects whether the address delivered to address bus by the unit which accepts the access request is present in the I/O area, or not.

Next, by referring to FIG. 4, operations of the I/O area detection unit 20 for detecting the above address are described below.

First, the address designating the I/O area is preliminarily set to the I/O address register 31, and at the same time, those data for masking addresses used for accessing are also preliminarily set to the I/O mask register 30.

Assume that the I/O areas of this data processing system are provided with addresses which range from A0000000 to A000FFFF, and an address A0000000 is stored in the I/O address register 31 which designates the addresses of I/O area.

The address of the I/O areas is A0000000 to A000FFFF, and thus, whether the address used for accessing is present in the I/O area or not is to be able to detect by comparing the upper 16 bits of the address used for accessing with the upper 16 bits of the I/O address. Accordingly, the address FFFF0000 is stored in the I/O mask register 32.

When the request is generated by the data processor 1 for accessing specific addresses and then the accessing is activated to allow the accessible address to be delivered to the address bus, the I/O area detection unit 20 receives the delivered address. Next, the address delivered to the I/O area detection unit 20 is logically ANDed, bit by bit, with the data in the I/O mask register 30 by the AND gates 32, and the result is transferred to the exclusive OR gates 33.

Next, the logically ANDed result is exclusive logically ORed, bit by bit, with the data in the I/O address register 31 by the exclusive OR gates 33, for checking to see if the logical ANDed result is equal to the data in the I/O address register 31. The result is transferred to the AND gates 34. Then, all bits of the exclusive logically ORed data are logically ANDed by the AND gates 34. Finally, the AND gates 34 outputs the I/O area address coincidence signal 26.

This signal is delivered to the instruction fetch unit 21, address calculation unit 22, operand fetch unit 23 and the bus control unit 25, respectively.

Next, referring now to FIG. 3, operations of respective constituents of the data processor 1 on receipt of the I/O area address coincidence signal 26 are described below.

First, when the I/O area address coincidence signal 26 outputted from the I/O area detection unit 20 remains effective as a result of accessing operation in accordance with the access request generated by the operand fetch unit 23 and the instruction execution completed signal 27 remains ineffective during a period of accessing operation in accordance with the access request generated by the operand fetch unit 23, the operand fetch unit 23 first identifies that the destination of accessing is the I/O area and the instruction execution unit 24 is under the execution condition of instruction, and then the operand fetch unit 23 provisionally suspends its operation. At the same time, when the I/O area address coincidence signal 26 remains effective and the instruction execution completed signal 27 remains ineffective during a period of accessing in accordance with the access request generated by the operand fetch unit 23, the bus control unit 25 compulsorily voids address strobe. Then, as soon as the instruction execution completed signal 27 becomes effective, the operand fetch unit 23 resumes its operation to execute the same accessing operation as was done before over again.

Next, when the I/O area address coincidence signal 26 remains effective as a result of accessing in accordance with the access request generated by the instruction fetch unit 21, the instruction fetch unit 21 identifies that the destination of accessing is the I/O area, and then, it activates exception. At the same time, when the I/O area address coincidence signal 26 remains effective during a period of accessing in accordance with the access request generated by the instruction fetch unit 21, the bus control unit 25 compulsorily voids address strobe.

Likewise, when the I/O area address coincidence signal 26 remains effective as a result of the accessing operation in accordance with the access request generated by the address calculation unit 22, the address calculation unit 22 identifies that the destination of accessing is th I/O area, and then it activates exception. At the same time, when the I/O area address coincidence signal 26 remains effective during a period of accessing in accordance with the access request generated by the address calculation unit 22, the bus control unit 25 compulsorily voids address strobe.

Next, operations of the data processor for accessing data which is present in both the I/O area and the area other than the I/O area are described below.

If the 4-byte data should be fetched across a word boundary of the I/O area and the area other than the I/O area, more particularly, if the upper 2 bytes of the address is present in a area other than the I/O area and the lower 2 bytes of the address in the I/O area for example, the circuit in the bus control unit 25 capable of detecting the mixed accessing against the I/O area and the area other than the I/O area then detects the presence of the mixed accesses of two kinds, and then, it thoroughly voids all the accesses before eventually activating exception.

The above-cited preferred embodiment allows the data processor related to the invention to designate an address denoting the I/O area on a byte basis. Another preferred embodiment allows the data processor related to the invention to simplify mechanisms needed for detecting whether the I/O area is accessed or not by designating the I/O area on the 4-byte basis such as page unit, thus achieving a satisfactory effect comparable to that of the above preferred embodiment.

Further details of the preferred embodiment of the data processor related to the present invention has been disclosed in the description of the preceding invention titled "DATA PROCESSOR", which was filed under the Japanese Patent Application No. 62-247418 (1987) applied for a patent by one of inventors of the present invention.

As is clear from the foregoing description, since the data processor related to the invention is provided with a constitution which allows the data processor to detect whether the accessing is underway against the I/O area, or not, by addition of less number of hardware, the data processor related to the invention securely reduces the burden on and simplifies constitution of software or the entire data processing system, thus eventually accelerating the data processing efficiency and speed as well.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor whose I/O area is memory-mapped, comprising:
   a first register which stores an address for designating said I/O area;
   a second register which stores data for masking an address used for accessing;
   logical AND means coupled to said second register which obtains a masked address from said data stored in said second register and an address used for accessing;
   coincidence detection means coupled to said first register and said logical AND means which detects coincidence of said masked address obtained by said logical AND means and an address stored in said first register; and
   means, coupled to said detection means, for outputting a coincidence signal when said coincidence detection means detects said coincidence.

2. A data processor whose I/O area is memory-mapped, comprising:
   detecting means for detecting accessing to said I/O area; and
   means, coupled to said means for detecting, for prohibiting fetching instructions from said I/O area when said detecting means detects accessing to said I/O area.

3. A data processor whose I/O area is memory-mapped, the data processor having a device for accessing, including accessing to obtain data and accessing to obtain an instruction, comprising:
   detecting means for detecting accessing to said I/O area; and
   means, coupled to said means for detecting, for activating an exception when an instruction is executed and said detecting means detects accessing to said I/O area, and said accessing to said I/O area is an accessing to obtain an instruction.

4. A data processor of a data processing system, which is provided with an instruction for accessing an operand under an indirect memory addressing mode, the data processor having a device for fetching data, including fetching an operand and fetching an address of an operand, and whose I/O area is memory-mapped, comprising:
   detecting means for detecting accessing to said I/O area; and
   means, coupled to said detecting means, for prohibiting fetching data from said I/O area when said detecting means detects accessing to said I/O area, and when said data is an address of an operand.

5. A data processor of a data processing system, which is provided with an instruction for accessing an operand under an indirect memory addressing mode, and having an addressable memory for storing information, and a memory-mapped I/O area, comprising:
   means for accessing said I/O area; and
   means, coupled to said means for accessing, for accessing a first address for an indirect memory addressing mode in which information stored in said addressable memory at said first address indicates a second address which contains data, and for starting an exception when an instruction is executed whose operand is the data existing at said second address, and said first address is in said I/O area.

6. A data processor having a memory-mapped I/O area, comprising:
   means for detecting accessing to said I/O area;
   means, coupled to said means for detecting, for activating an exception when data comprised of a plurality of bytes is accessed, said data being a single data, and at least a first of said plurality of bytes exists in said I/O area and at least a second of said plurality of bytes exists in an area other than said I/O area.

7. A data processor of a data processing system whose I/O area is memory-mapped, comprising:
   detecting means for detecting accessing to said I/O area;
   an execution unit which executes instructions;
   an operand fetch unit, coupled to said execution unit, which performs fetching of operands of said instructions, wherein said fetching of operands of at least one instruction causes accessing of said I/O area; and
   means, coupled to said operand fetch unit, and said detecting means for suspending said operand fetch unit from accessing said I/O area caused by a second instruction until said execution unit completes execution of a preceding instruction.

8. A data processor of a data processing system which is provided with an instruction for accessing an operand under an indirect memory addressing mode, the data processor having a device for fetching data, including fetching an operand and fetching an address of an operand, whose I/O area is memory-mapped, comprising:
   detecting means for detecting accessing to said I/O area;
   means, coupled to said detecting means for prohibiting fetching data from said I/O area when said detecting means detects accessing to said I/O area and when said data is an address of an operand; and
   means, coupled to said detecting means for activating an exception when an instruction is executed and said detecting means detects accessing to said I/O area, and said instruction is an instruction for accessing an operand under an indirect memory addressing mode.

9. A method for accessing data in a data processor whose I/O area is memory-mapped, comprising:
   detecting accessing to said I/O area; and
   prohibiting fetching an instruction from said I/O area when accessing to said I/O area is detected.

10. A method for accessing data in a data processor whose I/O area is memory-mapped, the data processor having a device for accessing, including accessing to obtain data and accessing to obtain an instruction, the method comprising:
    detecting accessing to said I/O area; and
    activating an exception when an instruction is executed and accessing to said I/O area is detected, and said accessing to said I/O area is an addressing to obtain an instruction.

11. A method for accessing data in a data processor which is provided with an instruction for accessing an operand under an indirect memory addressing mode, the data processor having a device for fetching data, including fetching an operand and fetching an address of an operand, whose I/O area is memory-mapped, comprising:
    detecting accessing to said I/O area; and
    prohibiting fetching data from said I/O area when accessing to said I/O area is detected, and when said data is an address of an operand.

12. A method for accessing data in a data processor which is provided with an instruction for accessing an operand under an indirect memory addressing mode, whose I/O area is memory-mapped, comprising:
    detecting accessing to said I/O area;
    prohibiting fetching data from said I/O area when accessing to said I/O area is detected; and
    activating an exception when an instruction is executed and accessing to said I/O area is detected.

13. A method for accessing data in a data processor whose I/O area is memory-mapped, comprising:
    activating an exception when a plurality of bytes is accessed, said plurality of bytes being one of a single operand and a single address, and at least a first of said plurality of bytes exists in said I/O area and at least a second of said plurality of bytes exists in an area other than said I/O area.

14. A method for accessing data in a data processor whose I/O area is memory-mapped, comprising:
    detecting accessing to said I/O area;
    providing an execution unit which executes instructions;
    providing an operand fetch unit which fetches operands of instructions wherein said fetching of operands for an instruction causes accessing of said I/O area; and
    suspending said operand fetch unit from accessing said I/O area caused by an instruction until said execution unit completes the execution of a preceding instruction.

15. A method for accessing data in a data processing system having an addressable memory for storing information, and a memory-mapped I/O system, comprising:
    providing a data processor having means for fetching information stored in said addressable memory at one of a plurality of memory addresses defining an address space, wherein a portion of said address space is an I/O area of the memory-mapped I/O system, and wherein at least one of said plurality of memory addresses is within said I/O area of said address space;
    providing a detection unit connected to said data processor;
    sending to said detection unit an indication of a first address to be fetched;
    determining whether said first address is in said I/O area, using said detection unit; and
    providing a first signal when said address is in said I/O area.

16. A method, as claimed in claim 15, further comprising:
    indirectly addressing a memory location by fetching the contents of a first of said plurality of memory addresses and subsequently fetching the contents of a second of said plurality of memory addresses whose address is indicated by the contents of said first of said plurality of memory addresses; and
    voiding said fetching of the contents of said first memory address when said first signal indicates that said first of said plurality of memory addresses is within said I/O area.

17. A method, as claimed in claim 15, wherein said step of providing a data processor includes providing an execution unit for executing instructions and instruction fetch means for fetching an instruction for execution by said execution unit from a specified memory address and further comprising:
    voiding said fetching of an instruction when said specified address is within said I/O area.

18. A method, as claimed in claim 15, wherein said step of providing a data processor comprises providing means for fetching a single operand or a single operand address, comprising a plurality of bytes, the method further comprising:

activating an exception when said first signal indicates that at least a first of said plurality of bytes exists in said I/O area and at least a second of said plurality of bytes is in an area other than said I/O area.

19. A method, as claimed in claim 15, wherein said step of providing a data processor comprises providing an operand fetch unit for accessing a memory location to prefetch an operand and an execution unit for executing one of a plurality of instructions; and further comprising:

suspending operation of said operand fetch unit for said prefetching an operand of a second instruction, said operand of said second instruction having an operand address, until the execution of a first instruction in said execution unit is completed, if said operand address is in said I/O area while said execution unit is executing a first instruction which was previous to said second instruction.

* * * * *